(No Model.)
W. JOHNSTON.
SHAFT COUPLING.
No. 331,200. Patented Nov. 24, 1885.
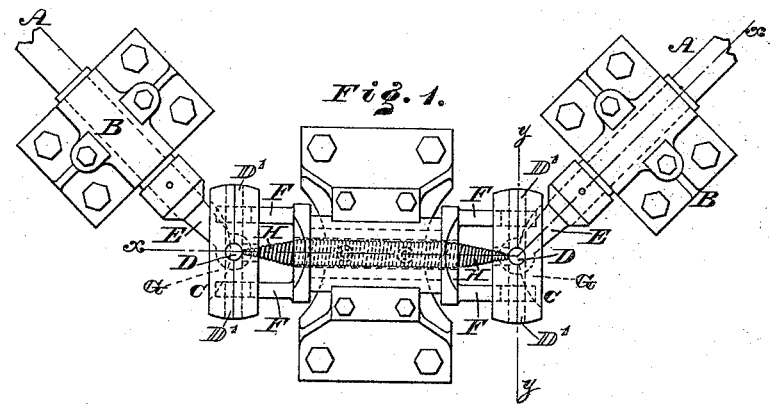
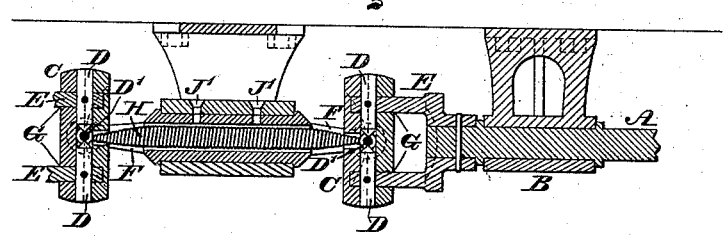
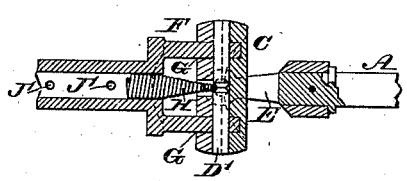 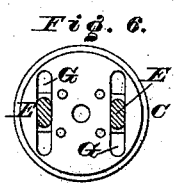
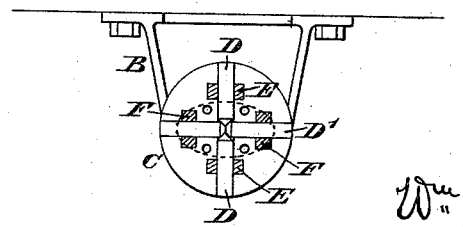
WITNESSES:
L. Douville
W. F. Kirchen
INVENTOR:
Wm Johnston
BY John A. Wiedersheim
ATTORNEY.
N. PETERS, Photo-Lithographer, Washington, D. C.

UNITED STATES PATENT OFFICE.

WILLIAM JOHNSTON, OF PHILADELPHIA, PENNSYLVANIA, ASSIGNOR OF ONE-HALF TO CHRISTOPHER GALLAGHER, OF SAME PLACE.

SHAFT-COUPLING.

SPECIFICATION forming part of Letters Patent No. 331,200, dated November 24, 1885.

Application filed May 19, 1885. Serial No. 165,976. (No model.)

*To all whom it may concern:*

Be it known that I, WILLIAM JOHNSTON, a citizen of the United States, residing in the city and county of Philadelphia, State of Pennsylvania, have invented a new and useful Improvement in Shaft-Couplings, which improvement is fully set forth in the following specification and accompanying drawings, in which—

Figure 1 represents a top or plan view of a shaft-coupling embodying my invention. Fig. 2 represents a section thereof in line $x\,x$, Fig. 1. Fig. 3 represents a section thereof on line $y\,y$, Fig. 1. Fig. 4 represents a view of the interior of one of the heads thereof. Figs. 5 and 6 represent, respectively, a front and rear view of the coupling-head.

Similar letters of reference indicate corresponding parts in the several figures.

My invention consists of a coupling for a sectional shaft whereby the shaft may be set at various angles and operated with facility at the angle to which it is set. For this purpose I employ a head, within which are mounted rocking journals at a right angle one to another, one journal being connected with forks attached to one of the sections of the shaft, and the other journal being attached to the other section, said forks playing in slots in the head, whereby the forks oscillate with freedom while the head revolves, thus causing the communication of power from one section of the shaft to the other by motion imparted to either section.

It further consists of a flexible duct for conveying oil or lubricant to the head, said duct rotating with the shaft and head and conforming to the angles assumed by said head in its oscillations.

Referring to the drawings, A represents a shaft, which is formed in sections, each of which has its bearings on hangers B, the latter being properly sustained in position.

C represents a head, within which are rocking journals D D', it being noticed that said journals extend at a right angle to each other. Connected with the journals D are forks E, and connected with the journals D' are forks or cranks F, it being noticed that the forks E F project from opposite sides of the head through slots G therein. It will also be noticed that when power is applied to either section of the shaft, so as to rotate the same, the motion is transmitted to the adjacent section by means of the forks E, head C, and forks F. In the operation of the forks and head the journals D D' have independent rocking motions, whereby when the sections are set at an angle the forks conform to the same, and thus rotate with freedom and with reduced friction, without changing the center of the head. It will also be noticed that the places of connection of the two forks with their respective journals are equidistant from the center, and said connections are inclosed within the heads. If desired, the heads may be divided in order to receive the journals and afterward properly secured together; or they may be made solid and bored through for similar purpose.

H represents a piece of coiled spring, which is passed from a hanger to the center of the head, whereby oil or lubricant may be directed by feed-openings J' in said hanger into the spring, and thence to the head for lubricating the movable parts, said spring conforming to the position of the head when the sections of the shaft are set at angles and rotating therewith.

One of the journals may be a continuous piece and the journal sectional, the journals meeting at or about the center of the head.

If desired, a number of sections of a shaft and disks with journals may be employed, so as to set the sections at various angles, the drawings showing two disks, which are connected with a section supported on a hanger intermediate of said disks, and made hollow to receive the flexible duct H, whereby both disks are lubricated therefrom.

Having thus described my invention, what I claim as new, and desire to secure by Letters Patent, is—

1. In a shaft-coupling, a disk having journals within the same, extending at an angle to each other and connected with cranks or forks which are attached to the sections of the shaft, substantially as described.

2. A head provided with journals mounted within the same and formed with slots in its sides to receive cranks or forks which are connected with said journals and projecting through said slots in opposite directions, substantially as described.

3. In a shaft-coupling, a flexible duct lubricating the journals of the head of the coupling, substantially as described.

4. In a shaft-coupling, a rotary disk with journals, and a hanger having openings or oil-ducts, in combination with a coiled spring connected with said hanger and disk, substantially as described.

WILLIAM JOHNSTON.

Witnesses:
JOHN A. WIEDERSHEIM,
A. P. GRANT.